United States Patent
Kim et al.

(10) Patent No.: US 9,838,123 B1
(45) Date of Patent: Dec. 5, 2017

(54) NONLINEAR NOISE MITIGATION WITH SPECTRAL INVERSION IN OPTICAL TRANSPORT NETWORKS

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/372,539

(22) Filed: Dec. 8, 2016

(51) Int. Cl.
*H04B 10/58* (2013.01)
*H04B 10/2513* (2013.01)
*H04B 10/40* (2013.01)
*H04B 10/69* (2013.01)
*H04B 10/27* (2013.01)

(52) U.S. Cl.
CPC ......... *H04B 10/2513* (2013.01); *H04B 10/27* (2013.01); *H04B 10/40* (2013.01); *H04B 10/58* (2013.01); *H04B 10/697* (2013.01)

(58) Field of Classification Search
CPC .... H04B 10/2513; H04B 10/40; H04B 10/58; H04B 10/697; H04B 10/27; H04B 10/25133; H04B 10/2569; H04B 2210/252; H04B 10/25253; G02B 6/29394
See application file for complete search history.

(56) References Cited

U.S. PATENT DOCUMENTS

| 9,344,190 | B2 | 5/2016 | Kim et al. |
| 2003/0118374 | A1* | 6/2003 | Eun ........................ G03G 15/08 399/252 |
| 2015/0333825 | A1* | 11/2015 | Kim ................. H04B 10/07953 398/26 |

OTHER PUBLICATIONS

EP 0700178, Optical transmission system with optimisation of thansmission condition, Tomofuji et al., Mar. 6, 1996.*
Rafique, Danish, et al. "Nonlinearity Compensation via Spectral Inversion and Digital Back-Propagation: A Practical Approach," OFC/NFOEC Technical Digest, 3 pages, 2012.
Kim, I., et al., "Impact of Link Symmetry on Nonlinear Noise Mitigation Using Spectral Inversion in Superchannel Transmission," OECC, 3 pages, 2016.
Zhu, Likai, et al., "Folded Digital Backward Propagation for Dispersion-Managed Fiber-Optic Transmission," Optics Express, vol. 19, No. 7, pp. 5953-5959, Mar. 2011.
Jansen, S.L., "Optical Phase Conjugation for Ultra Long-Haul Phase-Shift-Keyed Transmission," Journal of Lightwave Technology, vol. 24, No. 1., 11 pages (p. 54-64), Jan. 2006.
Jansen, S.L., "Long-Haul DWDM Transmission Systems Employing Optical Phase Conjugation," IEEE Journal of Selected Topics in Quantum Electronics, vol. 12, No. 4, pp. 505-520, 2006.

(Continued)

*Primary Examiner* — Ted Wang
(74) *Attorney, Agent, or Firm* — Baker Botts L.L.P.

(57) ABSTRACT

Methods and systems may mitigate nonlinear noise (NLN) penalties for optical paths using spectral inversion in optical transport networks. Using a tunable dispersion compensator with an optical amplifier at each span in an optical path, the dispersion along the optical path may be modified to a normalized dispersion for each span. In this manner, the dispersion associated with NLN accumulation may be balanced by NLN compensation to reduce overall NLN levels for the optical path.

18 Claims, 7 Drawing Sheets

(56) References Cited

OTHER PUBLICATIONS

Fok, Mable P.. et al., "Polarization-Insensitive Wavelength Conversion of DPSK Signal Using Four-Wave Mixing in 32-cm Bismuth-Oxide Highly Nonlinear Fiber," OSA, 2 pages, 2007.

Klekamp, Axel, et al., "Coherent Intradyne Opto-Electro-Optic Spectral Inverter and its Application for SPM Mitigation and Wavelength Conversion," ECOC, 3 pages, 2013.

* cited by examiner

NONLINEAR NOISE MITIGATION WITH SPECTRAL INVERSION IN OPTICAL TRANSPORT NETWORKS

BACKGROUND

Field of the Disclosure

The present disclosure relates generally to optical communication networks and, more particularly, to nonlinear noise mitigation with spectral inversion in optical transport networks.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

The distance that an optical signal can be transmitted with optical amplifiers for a given data rate depends on the impairments in the transmission system. Typically, the higher the data rate and the denser the wavelength spacing, the more susceptible the transmission system is to impairments. Impairments can include accumulated amplified spontaneous emission (ASE) noise, chromatic dispersion (CD), nonlinear optical effects (such as nonlinear noise), polarization mode dispersion, and polarization dependent loss. Digital signal processing (DSP) in coherent optical receivers may compensate for linear impairments such as CD, polarization mode dispersion and polarization dependent loss effectively. Intra-channel nonlinear impairment may also be compensated using digital back propagation in a coherent optical receiver with DSP, but such compensation may involve relatively extensive computational resources, which increases with optical signal bandwidth and is economically undesirable.

Nonlinear noise (NLN) may be mitigated by mid-span spectral inversion when the optical signal is transmitted across multiple spans. Mid-span spectral inversion may be achieved optically (using optical phase conjugation based on an optical parametric process) or electronically (using an optical-electrical-optical (OEO) conversion). Accordingly, spectral inverters may change or maintain the wavelength after performing spectral inversion. The accumulated CD and NLN of an optical signal may become reversed after spectral inversion is performed. Thus, to have optimal compensation of CD and NLN, placement of spectral inverters has typically been limited to a central location (the mid-point) of a transmission link, such that the link is exactly symmetric with respect to the spectral inversion. In real world systems, exact symmetry of the transmission links may not be feasible or practical.

SUMMARY

In one aspect, a disclosed method is for mitigating nonlinear noise in optical transport networks for optical paths. In an optical path having M number of transmission links prior to a spectral inversion node and N number of transmission links subsequent to the spectral inversion node, where each of the transmission links begins with an optical amplifier coupled to a tunable dispersion compensator, the method may include determining a normalized dispersion for each of the M+N number of transmission links. The accumulated dispersion of an optical signal linearly increases with respect to a propagation distance along each of the M transmission links and linearly decreases with respect to the propagation distance along each of the N transmission links. Beginning with the second transmission link of the M number of transmission links, at each of the M−1 transmission links, the method may also include using the tunable dispersion compensator to modify dispersion increased over the prior transmission link to the normalized dispersion, respectively. Beginning with the second transmission link of the N number of transmission links, at each of the N−1 transmission links, using the tunable dispersion compensator to modify dispersion decreased over the prior transmission link to the normalized dispersion, respectively.

In any of the disclosed embodiments of the method, M may equal N, while an optical launch power of each of the M+N number of transmission links may be equal.

In any of the disclosed embodiments of the method, the spectral inversion node may further include a dispersion compensation module. At the spectral inversion node, the method may further include using the dispersion compensation module to compensate for at least some dispersion along the Mth transmission link immediately prior to the spectral inversion node.

In any of the disclosed embodiments of the method, the dispersion compensation module may compensate for a first propagation distance calculated from a span length minus an effective length for the Mth transmission link. In the method, nonlinear noise may accumulate primarily along the effective length.

In any of the disclosed embodiments of the method, modifying the dispersion may include increasing the dispersion.

In any of the disclosed embodiments of the method, modifying the dispersion may include decreasing the dispersion.

In any of the disclosed embodiments of the method, the normalized dispersion may be based on an average length of the M+N transmission links.

In any of the disclosed embodiments of the method, the normalized dispersion may be based on a minimum length of the M+N transmission links.

In any of the disclosed embodiments of the method, the normalized dispersion may be based on a maximum length of the M+N transmission links.

In another aspect, a disclosed network management system performs the method for mitigating nonlinear noise in optical transport networks for optical paths.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENTS

Figure 1:
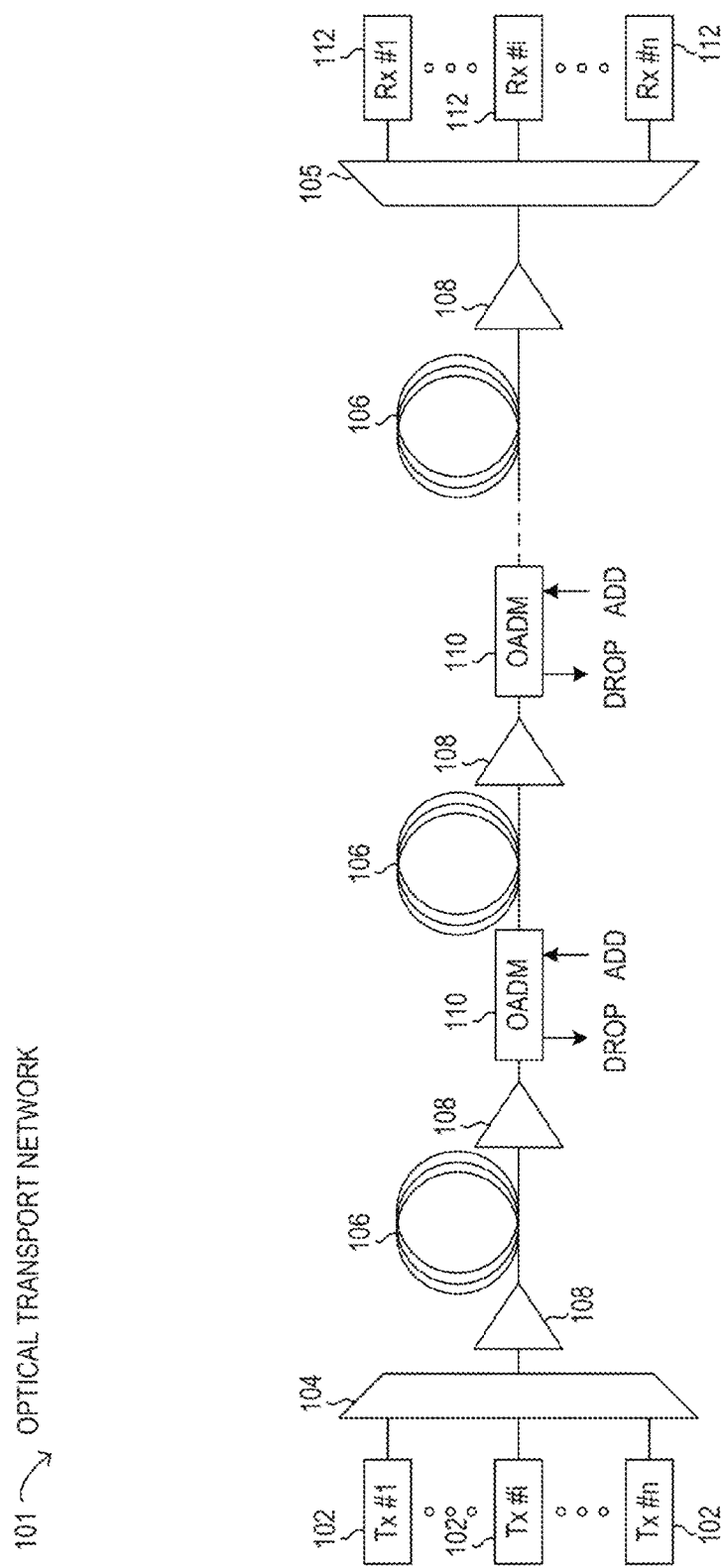
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of sub-carrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may include nodes that perform spectral inversion (SI). Spectral inversion converts an optical signal to a phase-conjugated optical signal. Spectral inversion can extend optical reach by mitigating nonlinear distortion. As noted, spectral inversion may be typically performed at a central location of a transmission link (optical path) to reverse accumulated linear and non-linear distortion, also referred to herein as linear noise and nonlinear noise. In many instances, other locations besides the central location of the transmission link may be equipped for spectral inversion, referred to as 'asymmetric' spectral inversion, which may be desirable for economic or practical reasons. Additionally, a spectral inversion node may include a dispersion compensation module (DCM) to compensate for certain dispersion prior to the spectral inversion node (see also FIG. 6), which may be referred to as pre-dispersed spectral inversion (PSI).

In modern optical transport networks, the optical reach of higher order modulation formats, such as 16 QAM, may be relatively short compared with lower order modulation formats, such as QPSK, due to a higher optical signal-to-noise ratio (OSNR) and smaller NLN tolerance that is associated with the higher order modulation formats. One conventional method to improve OSNR, increasing the launching power, is often not available due to the increase in NLN that results, which is undesirable. Another conventional method to mitigate NLN penalties is digital back-propagation, which involves large computational resources using a DSP at receiver 112. As noted above, mid-span spectral inversion is known to compensate for CD and associated NLN, however, achieving the exact symmetry in the optical path spans before and after the spectral inversion node is often not practical in real world optical transport networks, which limits the usefulness of spectral inversion in mitigating NLN noise.

As will be described in further detail herein, methods and systems are disclosed for NLN mitigation with spectral inversion over optical transport network 101. The methods and systems disclosed herein for NLN mitigation with spectral inversion may enable broader use of spectral inversion by allowing certain variations in optical path lengths, corresponding to real world conditions. The methods and systems disclosed herein for NLN mitigation with spectral inversion may rely upon a tunable dispersion compensator (TDC) used at each optical amplifier 108, which is a relatively low cost and simple method that can be adapted to existing optical transport networks. The methods and systems disclosed herein for NLN mitigation with spectral inversion may provide a level of NLN mitigation with non-uniform transmission links that is comparable to the NLN mitigation observed with uniform transmission links.

Figure 2:
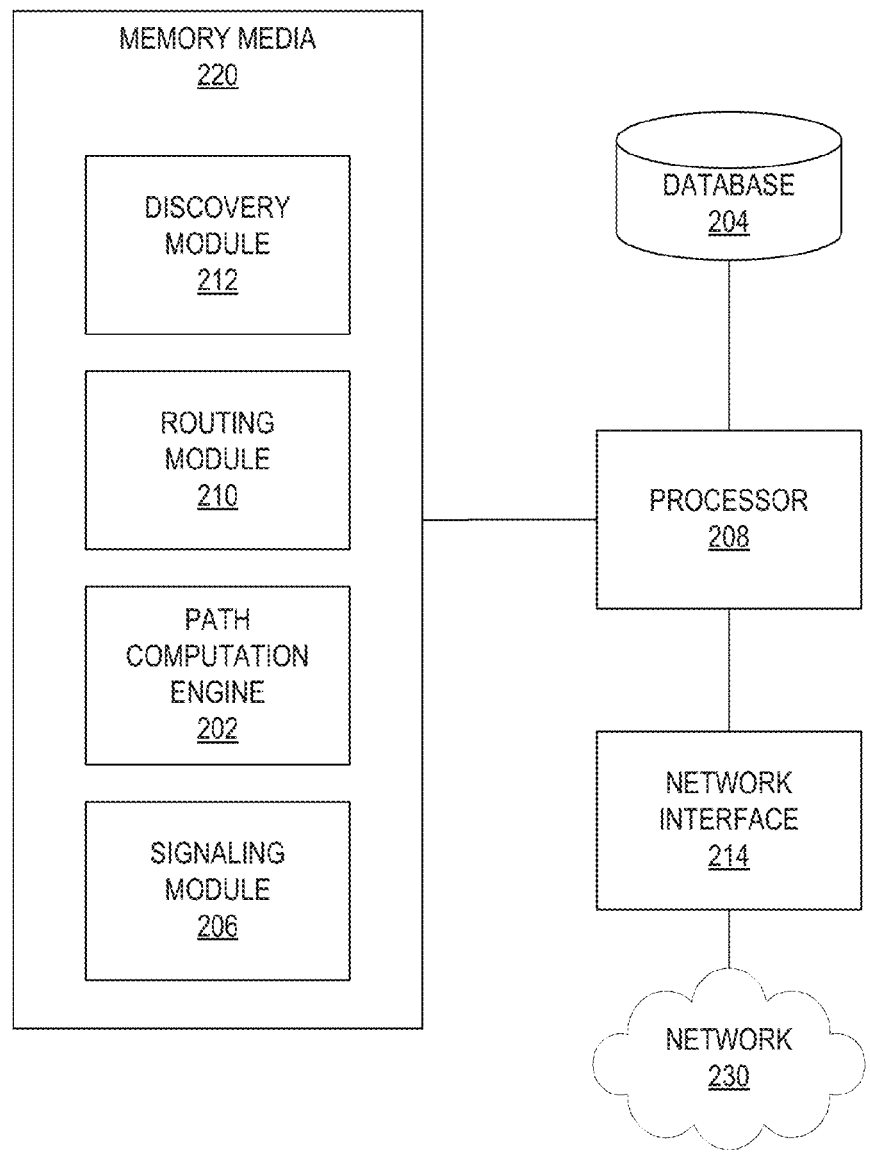
FIG. 2 is a block diagram of selected elements of an embodiment of an optical control plane system.

Referring now to FIG. 2, a block diagram of selected elements of an embodiment of control system 200 for implementing control plane functionality in optical networks, such as, for example, in optical transport network 101 (see FIG. 1), is illustrated. A control plane (or network management system) may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (such as executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, control system 200 may be configured to interface with a person (a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network element, for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of control system 200, path computation engine 202 may provide functionality for evaluating and determining candidate paths for a given pair of source and destination nodes in an optical network, such as optical transport network 101 in FIG. 1. In this effort, path computation engine 202 may use NLN penalty estimates for placement of a spectral inversion (SI) node. With the SI node, when TDC are used with amplifiers 108 in optical transport network 101 to tune dispersion, signaling module 206, for example, may be used to implement the NLN mitigation with spectral inversion described in further detail below.

Figure 3:
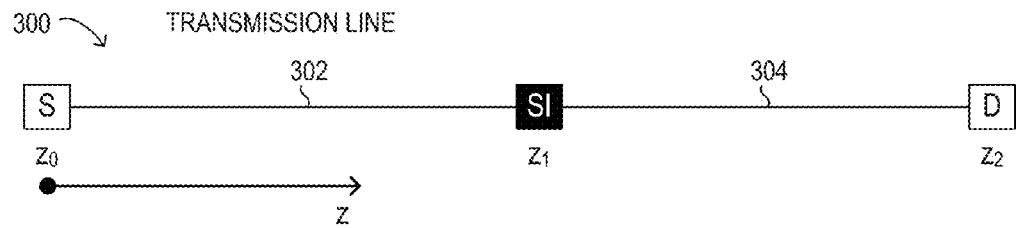
FIG. 3 is a schematic diagram of selected elements of an embodiment of a transmission line model using spectral inversion.

Referring now to FIG. 3, a schematic diagram of selected elements of an embodiment of a transmission line model 300 is illustrated. As shown, transmission line model 300 may represent a simple transmission link (an optical fiber path) between a source node S and a destination node D, between which a spectral inversion node SI is placed. Link 302 spans between source node S and spectral inversion node SI, while link 304 spans between spectral inversion node SI and destination node D. The propagation distance along links 302, 304 in transmission line model 300 is represented by axis z along the optical fiber path in a propagation direction, where source node S is located at distance $z_0$, spectral inversion node SI is located at distance $z_1$, and destination node D is located at distance $z_2$. With an exactly symmetric implementation of spectral inversion in transmission line model 300, links 302 and 304 are the same length, such that $z_1=z_2$, which may be a difficult condition to achieve in real world circumstances.

Figure 4:
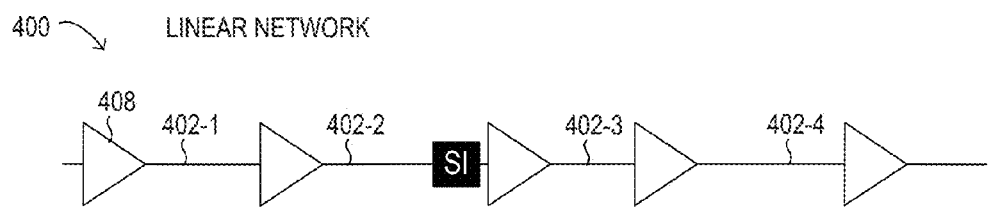
FIG. 4 is a schematic diagram of selected elements of an embodiment of a linear network model using spectral inversion.

Referring now to FIG. 4, a schematic diagram of selected elements of an embodiment of a linear network model 400 is illustrated. As shown, linear network model 400 may represent an optical fiber path having multiple links and a centrally located spectral inversion node SI. In the particular example embodiment shown in FIG. 4, linear network model 400 includes 4 links 402-1, 402-2, 402-3, and 402-4. Between certain links a generic repeater 408 is placed to maintain a signal amplitude. Generic repeater 408 may be an optical amplifier including a TDC (see FIG. 5), in various embodiments. Between link 402-2 and 402-3, a spectral inversion node (SI) has been put into operation, along with an optical amplifier for gain equalization. It is noted that spectral inversion node SI in linear network model 400 may be a pre-dispersed spectral inversion (PSI), in which the dispersion is compensated prior to spectral inversion node SI using a DCM. In this manner, improved symmetry in terms of power and accumulated dispersion may be obtained. It is further noted that in linear network 400, most NLN may accumulate in a so-called "effective length" of links 402-1 and 402-2 due to attenuation in the fiber when the fiber span is long enough. For example, when the attenuation is 0.2 dB/km, for a span length of 75 km, the effective length may be 21.03 km, and for a span length of 60 km, the effective length may be 20.34 km.

Figure 5:
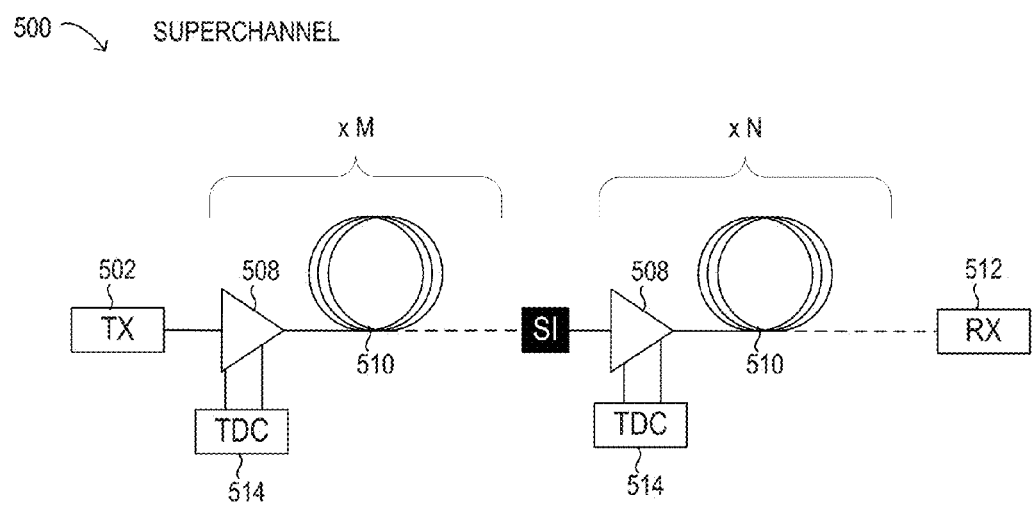
FIG. 5 is a schematic diagram of selected elements of an embodiment of a superchannel model using spectral inversion.

Referring now to FIG. 5, a schematic diagram of selected elements of an embodiment of an optical transport network 500 is illustrated. As shown, optical transport network 500 may represent an optical transport network transmitting a superchannel from transmitter 502 to receiver 512. In various embodiments, optical transport network 500 may represent optical transport network 101 (see FIG. 1) or linear network model 400 (see FIG. 4). Specifically, superchannel model 500 comprises M number of transmission links comprising an ideal optical amplifier 508 and link 510 after transmitter 502 and prior to spectral inversion node SI, and N number of transmission links of ideal optical amplifier 508/link 510 after spectral inversion node SI. The variables M and N are used to represent various different sizes and arrangements for optical transport network 500. For example, M and N may be integers that are greater than 2. As shown in FIG. 5, the dashed line is used to simplify the drawing by omitting the explicit illustration of M and N number of links for descriptive purposes, and to represent any different number of links in optical transport network 500.

Also shown in optical transport network 500, each optical amplifier 508 includes a respective TDC 514, which enables a certain amount of dispersion control. The dispersion control provided by TDC 514 may be positive to add dispersion, or negative to reduce dispersion. Because the accumulation and compensation of NLN is directly related to accumulated dispersion (see FIG. 6), TDC 514 may be used for NLN mitigation with spectral inversion, as disclosed herein.

Figure 6:
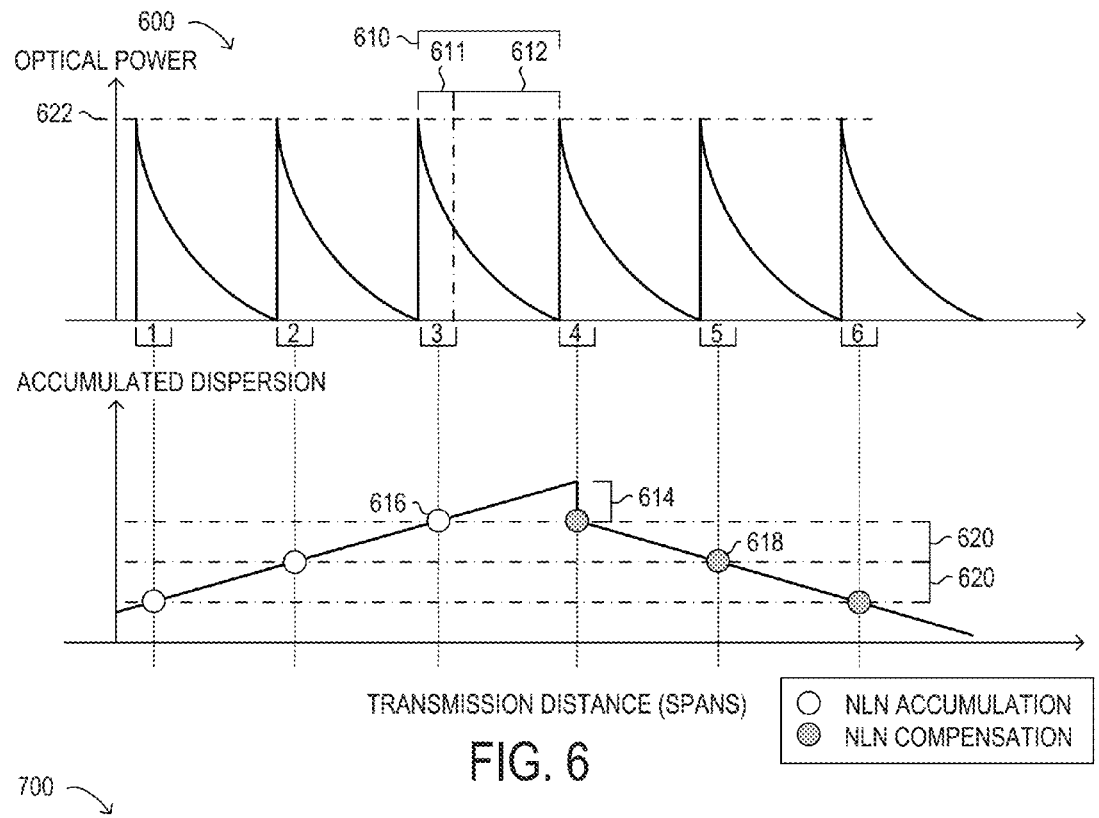
FIG. 6 is a schematic diagram of selected elements of an embodiment of a power and dispersion map.

Referring now to FIG. 6, a schematic diagram of selected elements of an embodiment of a power and dispersion map 600 is illustrated. It is noted that power and dispersion map 600 is not drawn to scale but is a schematic representation. Power and dispersion map 600 is based on optical transport network 500, in which M=N=3, such that a spectral inversion node SI (not shown in FIG. 6, see FIG. 5) is placed prior to a fourth optical amplifier having a respective TDC 514. It is noted that in some embodiments, the spectral inversion node SI may be a PSI node, as described previously to include a DCM. In power and dispersion map 600, optical power and accumulated dispersion and NLN are plotted versus transmission distance, given by the number of transmission links (spans) between optical amplifiers 508.

In power and dispersion map 600, at the third span (M=3), an effective length 611 of the third transmission link having span length 610 is shown as a representative schematic example for all spans in the power map portion (upper plot). Also shown is propagation distance 612 which constitutes the remaining distance in span length 610. It may be assumed that the optical transport network corresponding to power and dispersion map 600 has uniform span lengths 610 (transmission links with equal propagation distances) across the six depicted spans. For each transmission link, the power map portion shows an increase in optical power to an optical launch power 622, which is assumed to be uniform for all six transmission links, followed by a decay in optical power as the propagation distance in each transmission link increases towards the next transmission link.

In power and dispersion map 600, the dispersion map (lower plot) shows how dispersion (solid line) linearly increases with propagation distance over the first three spans (M=1, 2, 3) and linearly decreases with propagation over the last three spans (N=1, 2, 3) after the PSI node (not shown). Because the precompensated spectral inversion node PSI is located before the fourth span (N=1, labeled as 4 in FIG. 6), the DCM included in the PSI node may compensate for the dispersion in propagation distance 612 at the third span, which is shown as compensating dispersion 614 in the lower plot. Furthermore, the NLN accumulation 616 are shown as white-filled circles occurring at effective length 611 in each respective span (M=1, 2, 3), while NLN compensation 618 are shown as grey-filled circles occurring at effective length 611 in each respective span (N=1, 2, 3). Because all span lengths 610 are uniform and optical launch power 622 is constant for all spans, compensating dispersion 614 is sufficient to match NLN accumulation 616 with corresponding NLN compensation 618 at each respective span. An average dispersion per span 620 is therefore also a constant value, both for NLN accumulation 616 and NLN compensation 618. Thus, in the case of power and dispersion map 600, the NLN mitigation is expected to be very good even when no dispersion compensation is performed with TDC 514. The very good NLN mitigation in FIG. 6 may be the result of a similar pulse shape of the optical signal due to the same accumulated dispersion, which enables effective NLN compensation for the matching NLN accumulation.

Figure 7:
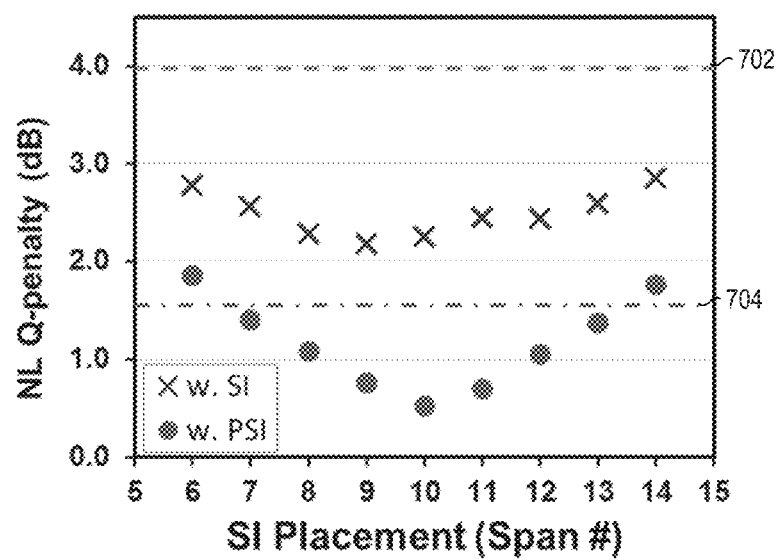
FIG. 7 is a plot of nonlinear noise penalties.

Referring now to FIG. 7, a plot 700 of NLN penalties is depicted. Plot 700 corresponds to power and dispersion map 600 described above with respect to FIG. 6, even though plot 700 shows actual data for 20 uniform transmission links of 60 km each for a middle subcarrier in a 5 subcarrier superchannel. In plot 700, nonlinear Q-penalty in dB is plotted versus a span number. A Q-penalty without spectral inversion SI is shown by constant line 702, while inter-subcarrier NLN is shown by constant line 704. In plot 700, we see that with spectral inversion SI (crosses in plot), the NL Q-penalty is reduced relative to line 702. However, with PSI (circles in plot), we see that the NL Q-penalty is reduced below line 704, indicating a very good level of NLN mitigation in the case of uniform spans and power levels as described with respect to FIG. 6.

Figure 8:
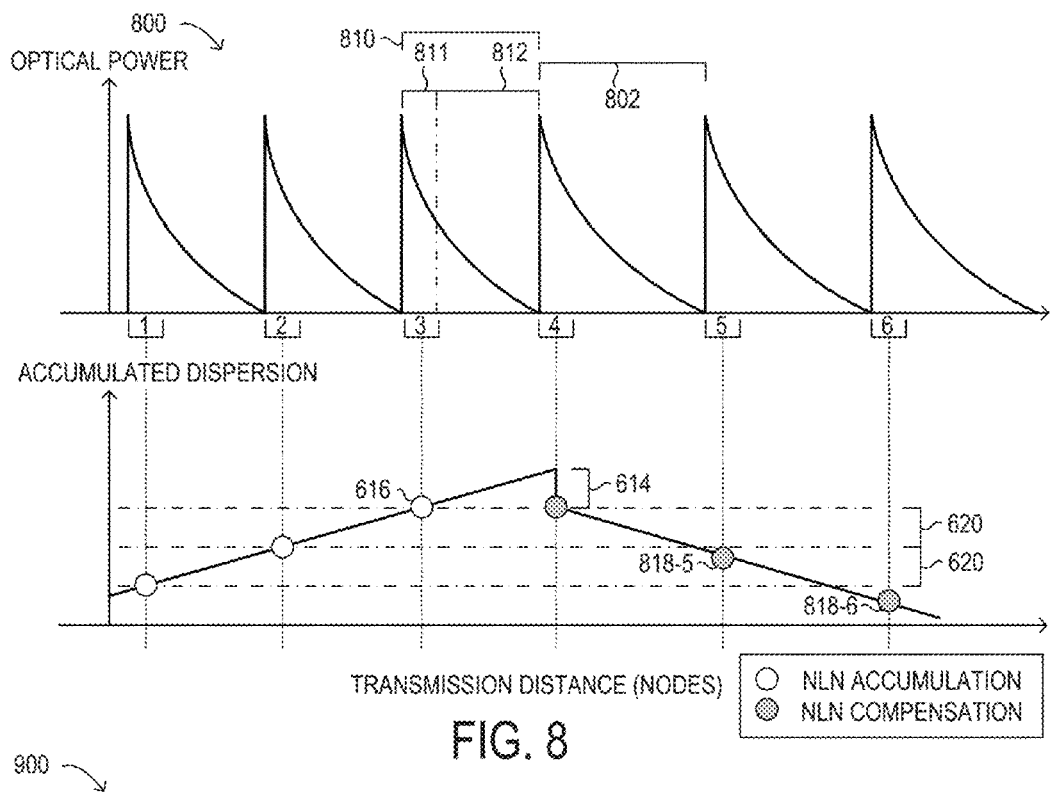
FIG. 8 is a schematic diagram of selected elements of an embodiment of a power and dispersion map.

Referring now to FIG. 8, a schematic diagram of selected elements of an embodiment of a power and dispersion map 800 is illustrated. It is noted that power and dispersion map 800 is not drawn to scale but is a schematic representation. Power and dispersion map 800 is based on optical transport network 500, in which M=N=3, such that a spectral inversion node SI (not shown in FIG. 8, see FIG. 5) is placed prior to a fourth optical amplifier having a respective TDC 514. It is noted that in some embodiments, the spectral inversion node SI may be a PSI node, as described previously to include a DCM. In power and dispersion map 800, optical power and accumulated dispersion and NLN are plotted versus transmission distance, given by the number of transmission links (spans) between optical amplifiers 508.

In power and dispersion map 800, similar features and elements are presented as in power and dispersion map 600 in FIG. 6. However, in FIG. 8, the last three spans (N=1, 2, 3) are assumed to be longer than the first three spans (M=1, 2, 3). Thus the first three transmission links have span length 810 (with effective length 811, compensated propagation distance 812), while the last three transmission links have span length 802, which is greater than span length 810. In the lower plot, NLN accumulation 616 remains unchanged, with the same compensated dispersion 614 as in FIG. 6. However, in power and dispersion map 800, NLN compensation 818-5 and 818-6 at the fifth and sixth spans are no longer at the same dispersion level as corresponding NLN accumulation 616 (for the first and second spans). As a result, NLN mitigation is imbalanced and may not be very good when no dispersion compensation is performed with TDC 514. The relatively poor NLN mitigation in FIG. 8 may be the result of a differing pulse shape of the optical signal due to differences in accumulated dispersion, which prevents effective NLN compensation due to the mismatching NLN accumulation.

Figure 9:
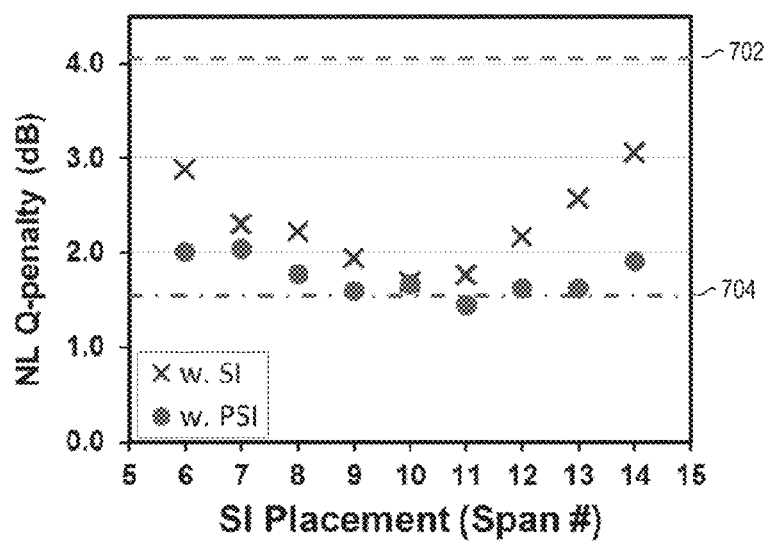
FIG. 9 is a plot of nonlinear noise penalties.

Referring now to FIG. 9, a plot 900 of NLN penalties is depicted. Plot 900 corresponds to power and dispersion map 800 described above with respect to FIG. 8, even though plot 900 shows actual data for 10 transmission links of 60 km each, followed by 10 transmission links of 75 km each for a middle subcarrier in a 5 subcarrier superchannel. In plot 900, nonlinear Q-penalty in dB is plotted versus a span number. A Q-penalty without spectral inversion SI is shown by constant line 702, while inter-subcarrier NLN is shown by constant line 704. In plot 900, we see that with spectral inversion SI (crosses in plot), the NL Q-penalty is reduced relative to line 702. However, with PSI (circles in plot), we see that the NL Q-penalty is not reduces substantially below line 704, indicating a lower level of NLN mitigation as compared to the case of uniform spans and power levels as described with respect to FIG. 6 and shown in FIG. 7.

Figure 10:
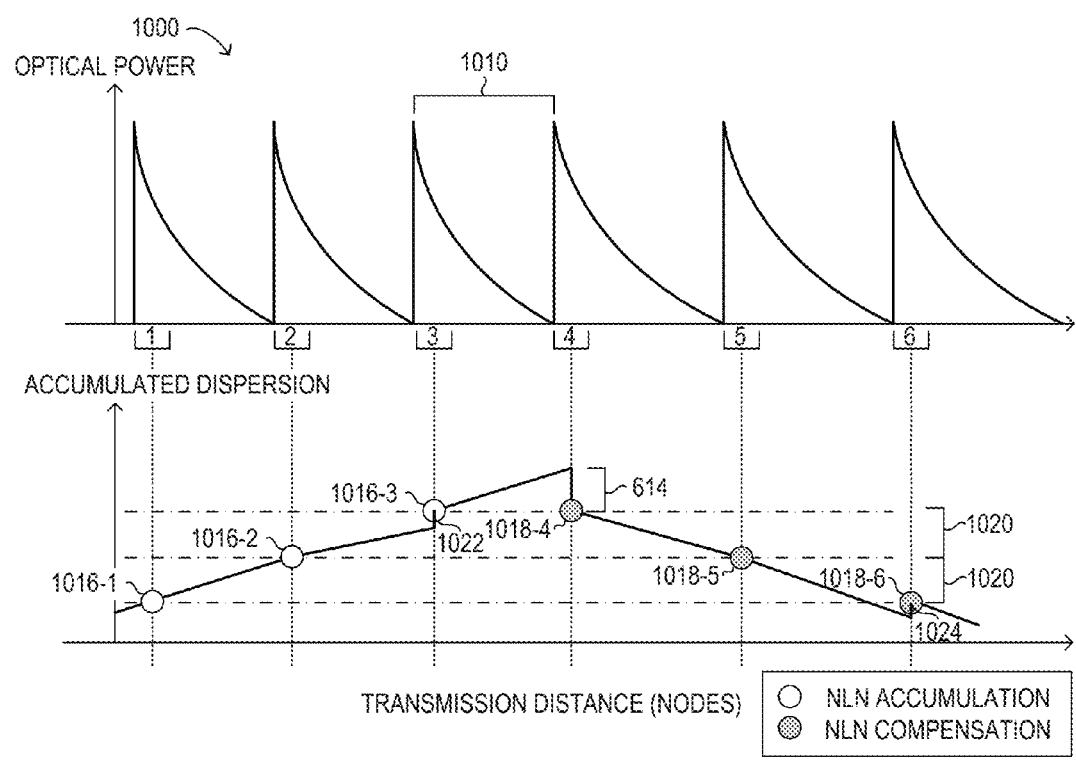
FIG. 10 is a schematic diagram of selected elements of an embodiment of a power and dispersion map.

Referring now to FIG. 10, a schematic diagram of selected elements of an embodiment of a power and dispersion map 1000 is illustrated. It is noted that power and dispersion map 1000 is not drawn to scale but is a schematic representation. Power and dispersion map 1000 is based on optical transport network 500, in which M=N=3, such that a precompensated spectral inversion node PSI (not shown in FIG. 10, see FIG. 5) is placed prior to a fourth optical amplifier having a respective TDC 514. It is noted that a PSI node, as described previously, includes a DCM. In power and dispersion map 1000, optical power and accumulated dispersion and NLN are plotted versus transmission distance, given by the number of transmission links (spans) between optical amplifiers 508.

In power and dispersion map 1000, it may be assumed that span length 1010 for each individual span varies to a certain degree, such that the span lengths are not uniform. In the lower plot portion, NLN accumulation 1016-1 at the first span (M=1) and NLN accumulation 1016-1 at the second span (M=2) may remain uncompensated by TDC 514, and whose difference may correspond to a normalized dispersion per span 1020. In various embodiments, normalized dispersion per span 1020 may be an average dispersion, a maximum dispersion, or a minimum dispersion for any set or subset of spans in an optical path. Because the second span may be somewhat shorter than the first span, NLN accumulation 1016-3 at the third span (M=3) may be lower than normalized dispersion per span 1020 relative to NLN accumulation 1016-2. In this case, TDC 514 may apply a dispersion modification 1022 at the third span (M=3) to align NLN accumulation to normalized dispersion per span 1020. Similarly, TDC may apply a dispersion modification 1024 at the sixth span (N=3, shown as span 6) to align NLN compensation 1018-6 to normalized dispersion per span 1020. NLN compensation 1018-4, and 1018-5 may remain unchanged. It is noted that dispersion remains linear with distance and that FIG. 10 is schematic and not drawn to scale. Although in FIG. 10, an example embodiment showing positive dispersion modifications 1022, 1024 are shown at two spans, it will be understood that positive or negative dispersion modification by TDC 514 may be performed at each span, as desired. The dispersion modifications 1022, 1024 are generally smaller in magnitude than dispersion compensation 614. As a result of dispersion modifications 1022, 1024 by TDC 514 at each respective optical amplifier 508, the NLN accumulation 1016 is now aligned with respect to cumulative dispersion with NLN compensation 1018, and a corresponding reduction in NL Q-penalty for the corresponding optical signals, as shown in FIG. 7, is expected and may be attained. In this manner in power and dispersion map 1000, non-uniform span lengths used with SI or PSI may be compensated to achieve NLN mitigation comparable to uniform span lengths shown in FIG. 6.

Figure 11:
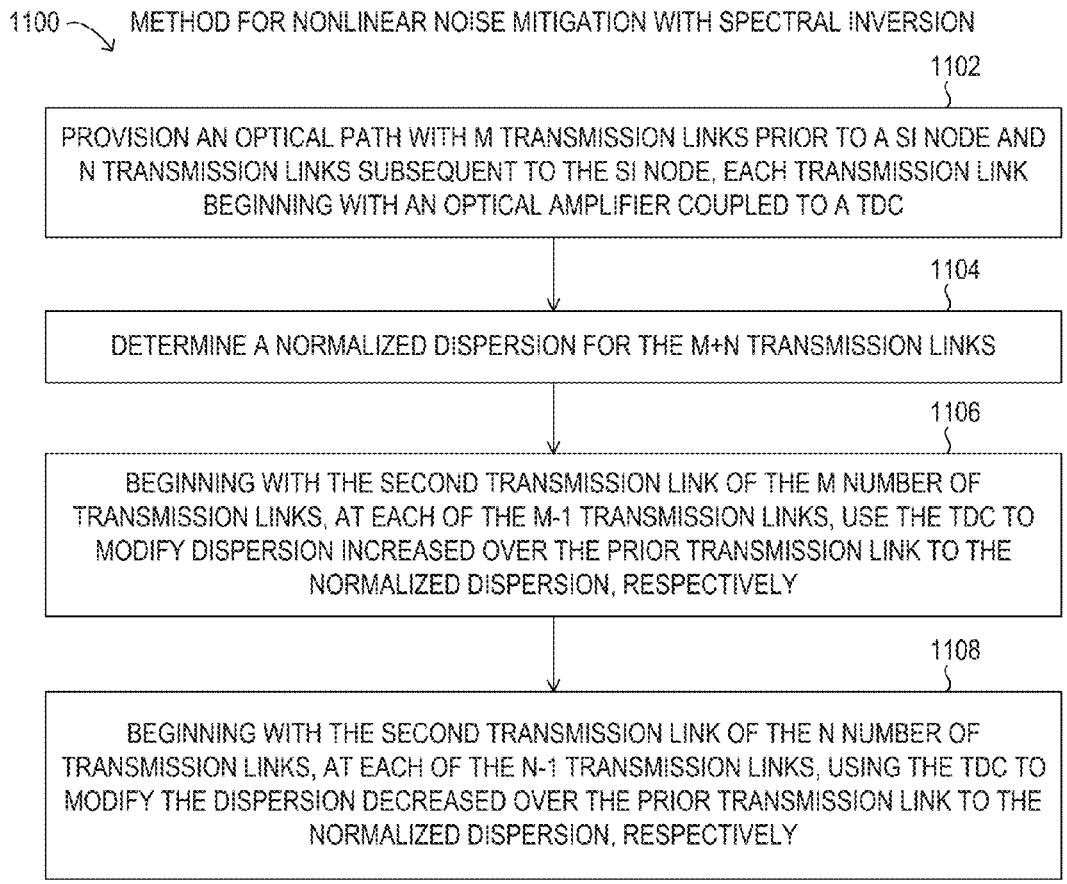
FIG. 11 is a flowchart of selected elements of an embodiment of a method for nonlinear noise mitigation with spectral inversion.

Referring now to FIG. 11, method 1100 for NLN mitigation with spectral inversion is shown in flowchart form. As shown method 1100 may be performed for optical transport network 101 (see FIG. 1) using signaling module 206, in particular embodiments, among other elements in control system 200. It is noted that operations described with respect to method 1100 may be omitted or rearranged in different embodiments.

Method 1100 may begin at step 1102 by provisioning an optical path with M transmission links prior to a SI node and N transmission links subsequent to the SI node, each transmission link beginning with an optical amplifier coupled to a TDC. It is noted that the SI node may be a PSI node. At step 1104, a normalized dispersion may be determined for the M+N transmission links. At step 1106, beginning with the second transmission link of the M number of transmission links, at each of the M−1 transmission links, the TDC is used to modify dispersion increased over the prior transmission link to the normalized dispersion, respectively. At step 1108, beginning with the second transmission link of the N number of transmission links, at each of the N−1 transmission links, the TDC is used to modify the dispersion decreased over the prior transmission link to the normalized dispersion, respectively. In some instances of steps 1106, 1108, no modification of the dispersion is performed by the TDC.

As disclosed herein, methods and systems may mitigate nonlinear noise (NLN) penalties for optical paths using spectral inversion in optical transport networks. Using a tunable dispersion compensator with an optical amplifier at each span in an optical path, the dispersion along the optical path may be modified to a normalized dispersion for each span. In this manner, the dispersion associated with NLN accumulation may be balanced by NLN compensation to reduce overall NLN levels for the optical path.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for mitigating nonlinear noise in optical transport networks for optical paths, the method comprising:
    in an optical path having M number of transmission links prior to a spectral inversion node and N number of transmission links subsequent to the spectral inversion node, wherein each of the transmission links begins with an optical amplifier coupled to a tunable dispersion compensator,
        determining a normalized dispersion for each of the M+N number of transmission links, wherein accumulated dispersion of an optical signal linearly increases with respect to a propagation distance along each of the M transmission links and linearly decreases with respect to the propagation distance along each of the N transmission links;
        beginning with the second transmission link of the M number of transmission links, at each of the M−1 transmission links, using the tunable dispersion compensator to modify dispersion increased over the prior transmission link to the normalized dispersion, respectively; and
        beginning with the second transmission link of the N number of transmission links, at each of the N−1 transmission links, using the tunable dispersion compensator to modify the dispersion decreased over the prior transmission link to the normalized dispersion, respectively.

2. The method of claim 1, wherein an optical launch power of each of the M+N number of transmission links is equal.

3. The method of claim 1, wherein the spectral inversion node further comprises a dispersion compensation module, and further comprising:
    at the spectral inversion node, using the dispersion compensation module to compensate for at least some dispersion along the Mth transmission link immediately prior to the spectral inversion node.

4. The method of claim 3, wherein the dispersion compensation module compensates for a first propagation distance calculated from a span length minus an effective length for the Mth transmission link, wherein nonlinear noise accumulates primarily along the effective length.

5. The method of claim 1, wherein modifying the dispersion comprises increasing the dispersion.

6. The method of claim 1, wherein modifying the dispersion comprises decreasing the dispersion.

7. The method of claim 1, wherein the normalized dispersion is based on an average length of the M+N transmission links.

8. The method of claim 1, wherein the normalized dispersion is based on a minimum length of the M+N transmission links.

9. The method of claim 1, wherein the normalized dispersion is based on a maximum length of the M+N transmission links.

10. A network management system for estimating nonlinear noise in optical transport networks for optical paths, the network management system comprising:
    a processor enabled to access a memory media storing instructions executable by the processor to, in an optical path having M number of transmission links prior to a spectral inversion node and N number of transmission links subsequent to the spectral inversion node, wherein each of the transmission links begins with an optical amplifier coupled to a tunable dispersion compensator,
        determine a normalized dispersion for each of the M+N number of transmission links, wherein accumulated dispersion of an optical signal linearly increases with respect to a propagation distance along each of the M transmission links and linearly decreases with respect to the propagation distance along each of the N transmission links;
        beginning with the second transmission link of the M number of transmission links, at each of the M−1 transmission links, use the tunable dispersion compensator to modify dispersion increased over the prior transmission link to the normalized dispersion, respectively; and
        beginning with the second transmission link of the N number of transmission links, at each of the N−1 transmission links, use the tunable dispersion compensator to modify the dispersion decreased over the prior transmission link to the normalized dispersion, respectively.

11. The network management system of claim 10, wherein an optical launch power of each of the M+N number of transmission links is equal.

12. The network management system of claim 10, wherein the spectral inversion node further comprises a dispersion compensation module, and further comprising instructions to:
    at the spectral inversion node, use the dispersion compensation module to compensate for at least some dispersion along the Mth transmission link immediately prior to the spectral inversion node.

13. The network management system of claim 12, wherein the dispersion compensation module compensates for a first propagation distance calculated from a span length minus an effective length for the Mth transmission link, wherein nonlinear noise accumulates primarily along the effective length.

14. The network management system of claim 10, wherein modifying the dispersion comprises increasing the dispersion.

15. The network management system of claim 10, wherein modifying the dispersion comprises decreasing the dispersion.

16. The network management system of claim 10, wherein the normalized dispersion is based on an average length of the M+N transmission links.

17. The network management system of claim 10, wherein the normalized dispersion is based on a minimum length of the M+N transmission links.

18. The network management system of claim 10, wherein the normalized dispersion is based on a maximum length of the M+N transmission links.

* * * * *